(12) United States Patent
Choi

(10) Patent No.: US 11,560,253 B2
(45) Date of Patent: Jan. 24, 2023

(54) ROLLER ASSEMBLY, PACKAGE INCLUDING THE ROLLER ASSEMBLY AND METHOD OF USING THE PACKAGE

(71) Applicant: Inno-Sports Co., Ltd, Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 392 days.

(21) Appl. No.: 16/795,615

(22) Filed: Feb. 20, 2020

(65) Prior Publication Data

US 2021/0214117 A1 Jul. 15, 2021

(30) Foreign Application Priority Data

Jan. 13, 2020 (CN) .......................... 202010033956.7
Jan. 13, 2020 (CN) .......................... 202020064025.9

(51) Int. Cl.
*B65D 5/42* (2006.01)
*B65B 5/04* (2006.01)
*B65D 5/468* (2006.01)
*B60B 33/00* (2006.01)
*B62B 1/12* (2006.01)
(Continued)

(52) U.S. Cl.
CPC .......... *B65D 5/4208* (2013.01); *A45C 13/385* (2013.01); *B60B 33/00* (2013.01); *B62B 1/12* (2013.01); *B65B 5/04* (2013.01); *B65D 5/4608* (2013.01); *B65D 90/18* (2013.01)

(58) Field of Classification Search
CPC .......... B65D 77/2056; B65D 2577/205; B65D 2577/2091; B65D 25/36; B65D 65/40; B65D 77/20; B65D 73/00; B65D 1/34; B65D 77/2048; B65D 77/2096
See application file for complete search history.

(56) References Cited

U.S. PATENT DOCUMENTS 4,772,035 A 9/1988 Danial
8,365,911 B2 * 2/2013 Oh ........................ B65D 85/00
280/47.131
(Continued)

FOREIGN PATENT DOCUMENTS

CA 3 052 069 A1 8/2018
CN 202216537 U 5/2012
(Continued)

*Primary Examiner* — Kareen K Thomas
(74) *Attorney, Agent, or Firm* — Morgan, Lewis & Bockius LLP

(57) ABSTRACT

A roller assembly includes at least one roller, an L-shaped board and at least one L-shaped fixing member. The L-shaped fixing member is fixed on the L-shaped board; and the roller is fixed and connected on the L-shaped board through the L-shaped fixing member. A package includes a box and the roller assembly. The box contains at least one hole and the roller protrudes from the hole. Further, the package is used as follows. The box is opened and the matter to be packaged is put into the box. Then the roller assembly is placed into the box, and the roller assembly is sandwiched between the box and the matter. Next, the roller(s) is aligned with the hole(s). Subsequently, the box and the matter are compressed to make the roller(s) protrude from the hole(s). Finally, the box are sealed from the bottom surface to complete the package.

18 Claims, 11 Drawing Sheets

(51) Int. Cl.
 *B65D 90/18* (2006.01)
 *A45C 13/38* (2006.01)

(56) References Cited

U.S. PATENT DOCUMENTS

| | | | | |
|---|---|---|---|---|
| 8,556,278 | B2* | 10/2013 | Brittain | B65D 5/0227 |
| | | | | 280/37 |
| 8,905,412 | B2* | 12/2014 | Fux | B62B 1/18 |
| | | | | 280/47.26 |
| 2003/0155728 | A1 | 8/2003 | Dacosta | |
| 2003/0167597 | A1* | 9/2003 | Tsai | B60B 33/0002 |
| | | | | 16/35 R |
| 2005/0269791 | A1* | 12/2005 | Hoiriis | B65D 25/20 |
| | | | | 280/47.131 |
| 2005/0279662 | A1* | 12/2005 | Olmsted | B65D 5/4208 |
| | | | | 206/321 |
| 2006/0289547 | A1* | 12/2006 | Ewing | A45C 11/20 |
| | | | | 220/592.2 |
| 2007/0074983 | A1* | 4/2007 | Oh | B65D 85/00 |
| | | | | 206/326 |
| 2007/0228096 | A1* | 10/2007 | Lin | A45C 7/0063 |
| | | | | 190/103 |
| 2008/0073871 | A1* | 3/2008 | Winkel | B62B 5/06 |
| | | | | 280/415.1 |
| 2009/0019670 | A1* | 1/2009 | Tsai | B60B 33/0073 |
| | | | | 16/35 R |
| 2019/0381829 | A1 | 12/2019 | Brantley et al. | |

FOREIGN PATENT DOCUMENTS

| | | |
|---|---|---|
| CN | 204172940 U | 2/2015 |
| DE | 202005008802 U1 | 8/2005 |
| DE | 202013006119 U1 | 8/2013 |
| DE | 102012211563 A1 | 1/2014 |
| JP | S49127947 U | 11/1974 |
| JP | S49128642 U | 11/1974 |
| JP | S49128643 U | 11/1974 |
| JP | S5140203 Y2 | 10/1976 |
| JP | S5140204 Y2 | 10/1976 |
| JP | S5235821 Y2 | 8/1977 |
| JP | S5235822 Y2 | 8/1977 |
| JP | S5418761 Y2 | 7/1979 |

* cited by examiner

ROLLER ASSEMBLY, PACKAGE INCLUDING THE ROLLER ASSEMBLY AND METHOD OF USING THE PACKAGE

TECHNICAL FIELD

The present disclosure relates to the technical field of packages. More specifically, the present disclosure relates to a roller assembly, a package including the roller assembly and a method of using the package.

BACKGROUND

Transportation of goods from one location to another location has many challenges. Saving costs and resources are important factors to be considered during transportation. Goods to be transported usually have an external package and are normally transported by transport machine, such as trolly, truck, service cart, or just by humans. Transporting by machine will consume a large amount of resources, while transporting by humans will not only waste resources but also affect transportation efficiency.

SUMMARY

In order to solve the problems described in the prior art, the first aspect of the present disclosure provides a roller assembly, the second aspect of the present disclosure provides a package including the roller assembly, and the third aspect of the present disclosure provides a method of using the package.

According to the first aspect of the present disclosure, the roller assembly includes at least one roller, an L-shaped board, and at least one L-shaped fixing member. The at least one L-shaped fixing member is fixed on the L-shaped board; and the at least one roller is fixed and connected on the L-shaped board through the at least one L-shaped fixing member.

Further, the L-shaped board includes the first portion and the second portion, the first portion and the second portion intersect to form the first edge, and the at least one L-shaped fixing member is fixed on the L-shaped board along the first edge.

Further, each L-shaped fixing member includes a third portion and a fourth portion, the third portion and the fourth portion intersect to form the second edge; when the each L-shaped fixing member is fixed on the L-shaped board, the second edge abuts against the first edge, the third portion is fixed on the first portion, and the fourth portion is fixed on the second portion.

Further, the number of the at least one roller is equal to the number of the at least one L-shaped fixing member; each L-shaped fixing member is inherently provided with a roller bracket on the third portion, and the at least one roller is fixed and connected on the L-shaped board through the roller bracket.

Further, at least one roller is fixed and connected to the roller bracket through a connecting rod, the connecting rod passes through the center of at least one roller, the two ends of the connecting rod are fixed and connected on the roller bracket, and at least one roller may rotate around the connecting rod.

Further, the two ends of the connecting rod are fixed and connected on the roller bracket by screws, magnets or solders. Other connection manner may be used as well.

Further, at least one L-shaped fixing member is fixed on the L-shaped board by screws, magnets or solders. Other connection manner may be used as well.

Further, the L-shaped board is made of plastic, metal or rubber. The L-shaped fixing member is made of plastic, metal or rubber. The roller is made of plastic, metal or rubber. Other materials may be used as well.

According to the second aspect of the present disclosure, the package includes a box and the roller assembly. The box includes at least one hole; and at least one roller protrudes from the box through at least one hole.

Further, the box includes a top surface, a plurality of sidewalls and a bottom surface. The bottom surface is openable, the bottom surface meets the plurality of sidewalls to define a plurality of corner edges, and the at least one hole is formed on one of the plurality of corner edges.

Further, a handle chamber is arranged on the top surface, and a foldable handle is installed in the handle chamber.

Further, the handle chamber is a U-shaped groove, and the U-shaped groove is symmetrical with respect to the center line of the top surface.

Further, the handle chamber is a bar groove, and one end of the bar groove is arranged on the center line of the top surface.

According to the third aspect of the present disclosure, the method of using the package includes the following steps:

opening the box and putting a matter to be packaged into the box;

placing the roller assembly into the box, wherein the roller assembly is sandwiched between the box and the matter to be packaged;

aligning the at least one roller with the at least one hole;

compressing the box and the matter to be packaged to make the at least one roller protrude from the at least one hole;

sealing the box to complete the package.

Compared with the prior art, the present disclosure has the following advantages. Adding roller assembly on the box for packaging the goods to be transported significantly saves resources during the transportation and improve the transportation efficiency, because there is no need to resort to external forces when carrying the goods. In addition, the conventional wheel box includes wheels/rollers which are directly fixed on the box, therefore when such wheel box is packaged with goods, most of the loadings will be concentrated on the point where the wheels/rollers are fixed on the box, which is extremely likely to cause box breakage from the connection point. However, in the present disclosure, the roller assembly is detachable from the box, and the rollers are fixed on the L-shaped board instead of the box itself. This structure of the roller assembly facilitates the transportation and avoids the box breakage at the same time, thereby ensuring the transportation efficiency and improving the transportation safety.

DETAILED DESCRIPTION OF THE EMBODIMENTS

The present disclosure will be further described below in detail with reference to the accompanying drawings and embodiments. However, it should be understood that the specific embodiments described herein are used only to explain the present disclosure, and are not intended to limit the scope of the disclosure.

Embodiment 1

Figure 1:
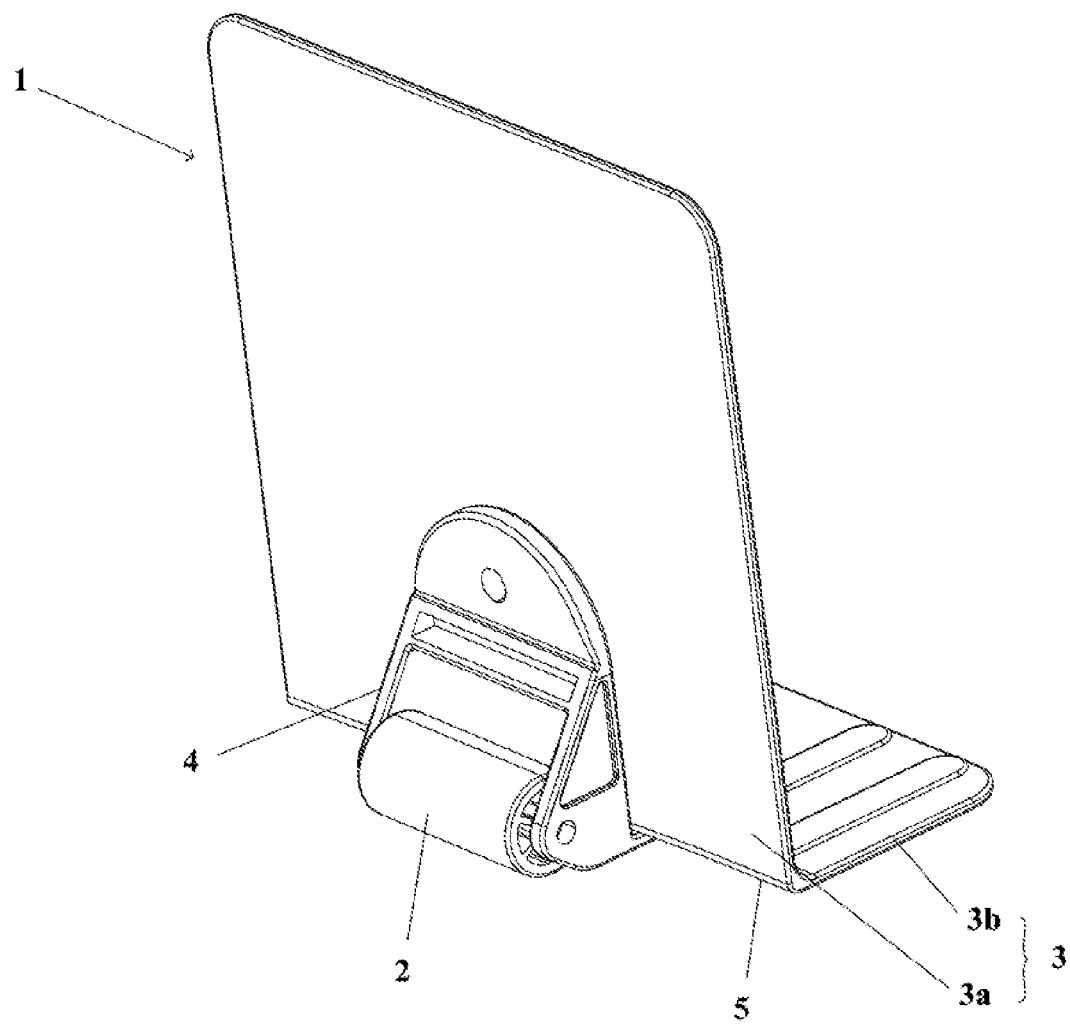
FIG. 1 shows the roller assembly according to Embodiment 1 of the present disclosure.

As shown in FIG. 1, the roller assembly 1 includes one roller 2, the L-shaped board 3, and one L-shaped fixing member 4. The L-shaped fixing member 4 is fixed on the L-shaped board 3; and the roller 2 is fixed and connected on the L-shaped board 3 through the L-shaped fixing member 4. The L-shaped board 3 includes the first portion 3a and the second portion 3b, the first portion 3a and the second portion 3b intersect to form the first edge 5, and the L-shaped fixing member 4 is fixed on the L-shaped board 3 along the first edge 5.

Figure 3:
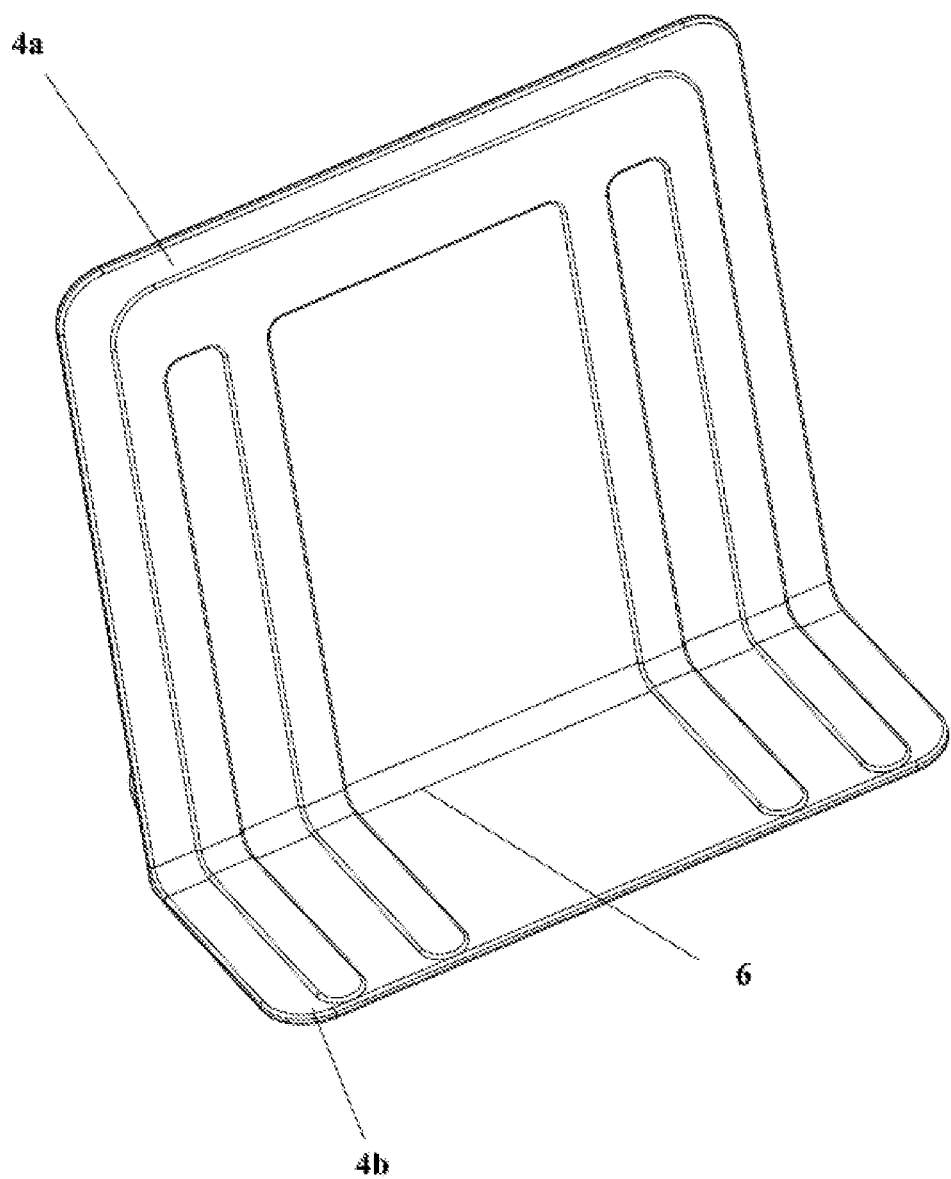
FIG. 3 shows the L-shaped fixing member according to Embodiment 1 of the present disclosure from a back-side view.

Referring to FIG. 0.2 and FIG. 3, the L-shaped fixing member 4 includes the third portion 4a and the fourth portion 4b, the third portion 4a and the fourth portion 4b intersect to form the second edge 6; when the L-shaped fixing member 4 is fixed on the L-shaped board 3, the second edge 6 abuts against the first edge 5, the third portion 4a is fixed on the first portion 3a, and the fourth portion 4b is fixed on the second portion 3b. The L-shaped fixing member 4 is inherently provided with the roller bracket 7 on the third portion 4a, and the roller is fixed and connected on the L-shaped board 3 through the roller bracket 7. The roller 2 is fixed and connected to the roller bracket 7 through a connecting rod 8, the connecting rod 8 passes through the center of the roller 2, the first end 8a and the second end 8b of the connecting rod 8 are fixed and connected on the roller bracket 7, and the roller 2 may rotate around the connecting rod 8. The first end 8a and the second end 8b of the connecting rod 8 are fixed and connected on the roller bracket 7 by screws, magnets or solders. Other connection manner may be used as well. In one configuration, the connecting rod 8 is integrated with the roller bracket 7 to form into one piece, so that the overall structure of the roller assembly 1 is firm enough, ensuring the transportation safety and stability. In another configuration, the connecting rod 8 is detachable from the roller bracket 7, thus the roller 2 can be conveniently replaced in case the roller assembly 1 does not function due to the wear of the roller 2.

The L-shaped fixing member 4 is fixed on the L-shaped board 3 by screws, magnets or solders. Other connection manner may be used as well. The L-shaped board 3 is made of plastic, metal or rubber. Other materials may be used as well.

Figure 2:
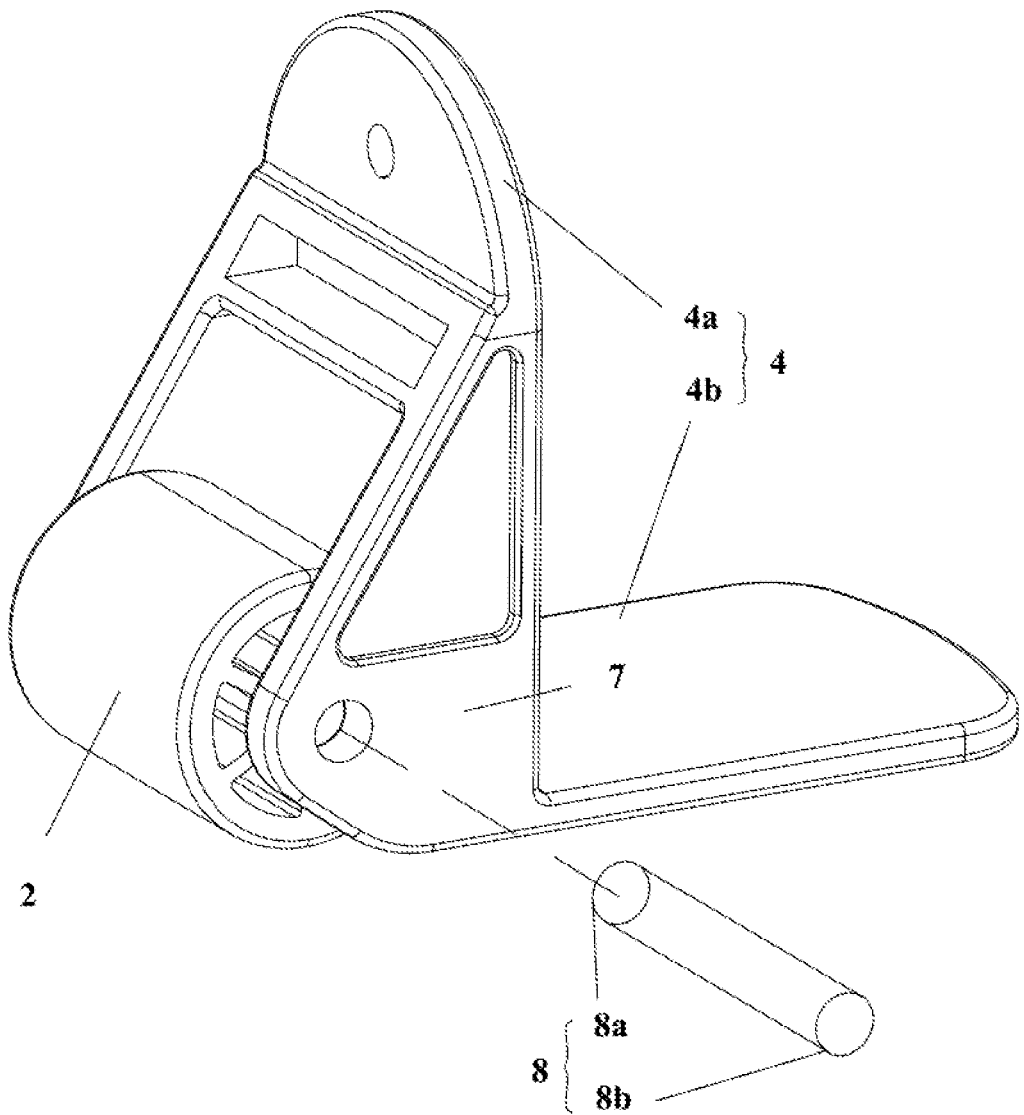
FIG. 2 shows the L-shaped fixing member according to Embodiment 1 of the present disclosure from a front-side view.

While certain configuration is shown in FIG. 1-FIG. 3, the size of the roller assembly 1 can be any size. The size of the L-shaped board 3 can be any size. The size of the L-shaped fixing member 4 can be any size. The size of the roller 2 can be any size.

Embodiment 2

Figure 4:
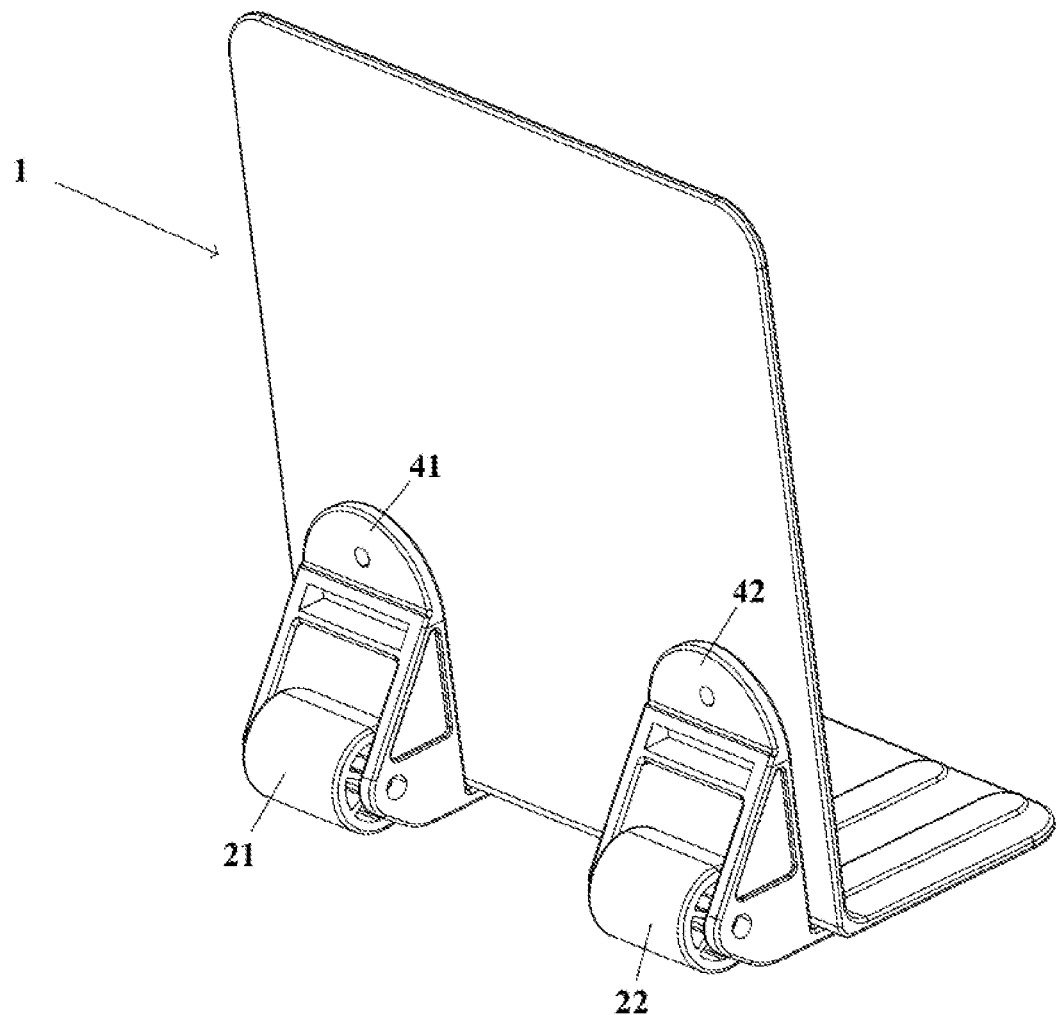
FIG. 4 shows the roller assembly according to Embodiment 2 of the present disclosure.

In the present embodiment, the structure of the roller assembly 1 is similar to the structure of the roller assembly described in Embodiment 1, the only difference is that the roller assembly 1 includes two or more rollers, and two or more L-shaped fixing members. The number of the rollers is equal to the number of the L-shaped fixing members. Specifically, two rollers and two L-shaped fixing members are used herein as an example. As shown in FIG. 4, the roller assembly 1 includes the first roller 21, the second roller 22, the first L-shaped fixing member 41 and the second L-shaped fixing member 42. Other elements are the same as those in Embodiment 1. The first L-shaped fixing member 41 and the second L-shaped fixing member 42 are symmetrically fixed on the L-shaped board 3 along the first edge 5.

While certain configuration is shown in FIG. 4, the size of the roller assembly 1 can be any size. The size of the L-shaped board 3 can be any size. The size of the L-shaped fixing member 4 can be any size. The size of the roller 2 can be any size.

Embodiment 3

Figure 5:
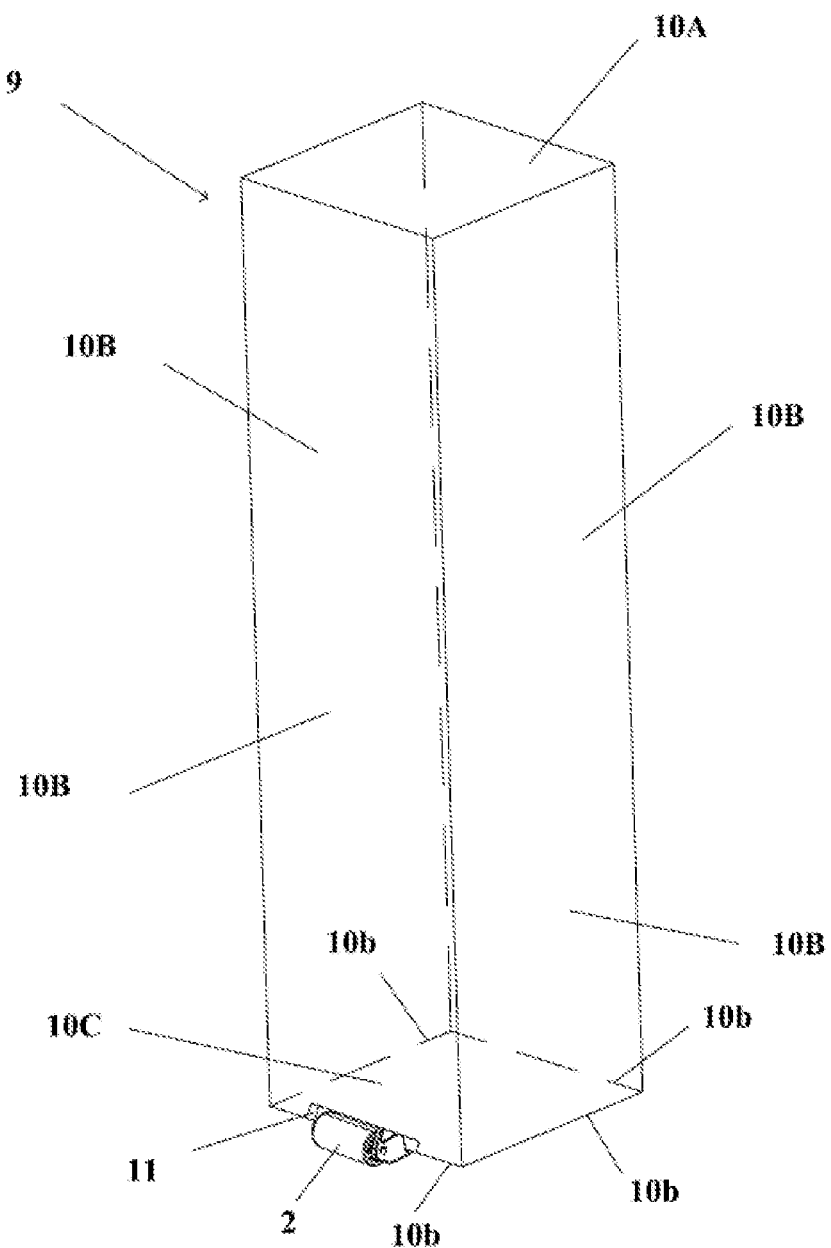
FIG. 5 shows the package according to Embodiment 3 of the present disclosure.

As shown in FIG. 5, the package 9 includes the box 10 and the roller assembly 1. The structure of the roller assembly 1 is the same as that described in Embodiment 1. The box 10 includes one hole 11; and the roller 2 protrudes from the box 10 through the hole 11. The box includes the top surface 10A, a plurality of sidewalls 10B and the bottom surface 10C. The bottom surface 10C is openable, the bottom surface 10C meets the plurality of sidewalls to define a plurality of corner edges 10b, and the hole 11 is formed on one of the plurality of corner edges 10b. In other configuration, each of the plurality of corner edges 10b is provided with one hole 11, or any number of the plurality of corner edges 10b is respectively provided with one hole 11.

While certain configuration is shown in FIG. 5, the size of the package 9 can be any size. The size of the box 10 can be any size. The size of the hole 11 can be any size. The size of the roller assembly 1 can be any size. The size of the roller 2 can be any size.

Embodiment 4

Figure 6:
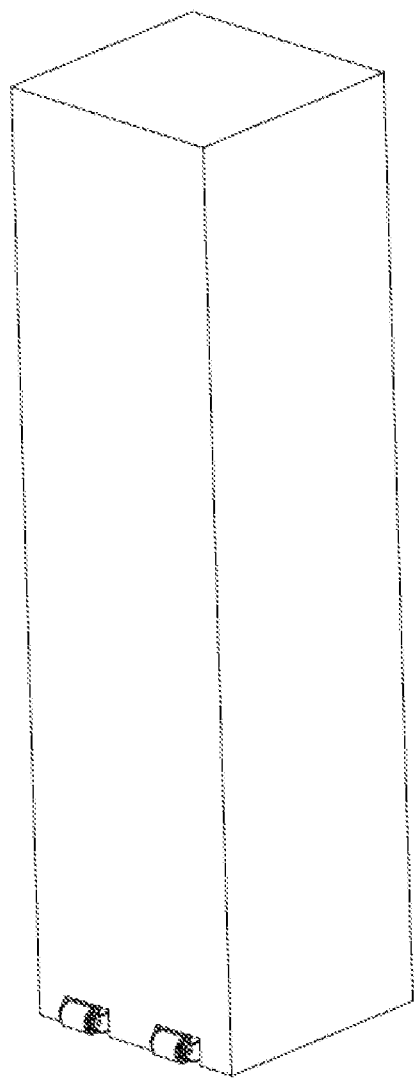
FIG. 6 shows the package according to Embodiment 4 of the present disclosure.

In the present embodiment, the structure of the package 9 is similar to the structure of the package described in Embodiment 3, the only difference is that the structure of the roller assembly 1 is the same as that described in Embodiment 2, as shown in FIG. 6.

While certain configuration is shown in FIG. 6, the size of the package 9 can be any size. The size of the box 10 can be any size. The size of the hole 11 can be any size. The size of the roller assembly 1 can be any size. The size of the roller can be any size.

Embodiment 5

Figure 7:
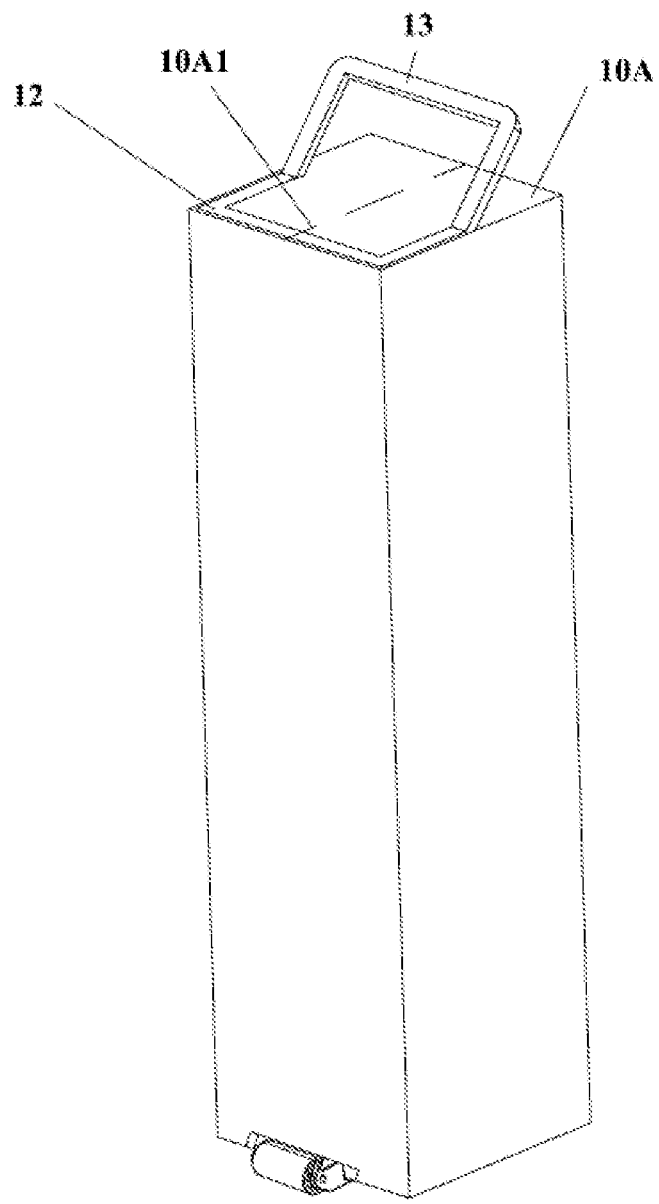
FIG. 7 shows the package according to Embodiment 5 of the present disclosure.

In the present embodiment, the structure of the package 9 is similar to the structure of the package described in Embodiment 3 or Embodiment 4, the only difference is that the handle chamber 12 is arranged on the top surface 10A, and the foldable handle 13 is installed in the handle chamber 12. The shape of the foldable handle 13 is substantially matched with the shape of the handle chamber 12. The handle chamber 12 is a U-shaped groove, and the U-shaped groove is symmetrical with respect to the center line 10A1 of the top surface 10A, as shown in FIG. 7. The width of the U-shaped groove can be equal to or less than the width of the box. When the package 9 is transported, the foldable handle 13 can be pulled out of the handle chamber 12. When the package 9 is not transported, the foldable handle 13 can be entirely received in the handle chamber 12. While certain configuration is shown in FIG. 7, the size of the package 9 can be any size.

Embodiment 6

Figure 8:
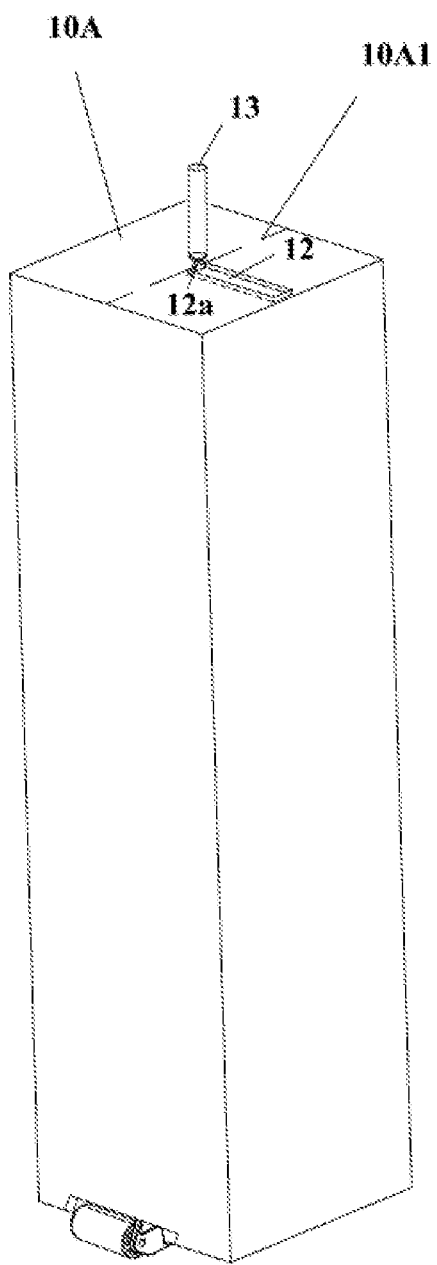
FIG. 8 shows the package according to Embodiment 6 of the present disclosure.

In the present embodiment, the structure of the package 9 is similar to the structure of the package described in Embodiment 5, the only difference is that the handle chamber 12 is a bar groove, and one end 12a of the bar groove is arranged on the center line 10A1 of the top surface 10A, as shown in FIG. 8. One end of the foldable handle 13 is fixed at the end 12a of the bar groove. The length of the bar groove can be equal to or less than ½ width of the box. When the package 9 is transported, the foldable handle 13 can be pulled out of the handle chamber 12 around the end 12a. When the package 9 is not transported, the foldable handle 13 can be entirely received in the handle chamber 12. While certain configuration is shown in FIG. 8, the size of the package 9 can be any size.

Embodiment 7

Figure 9:
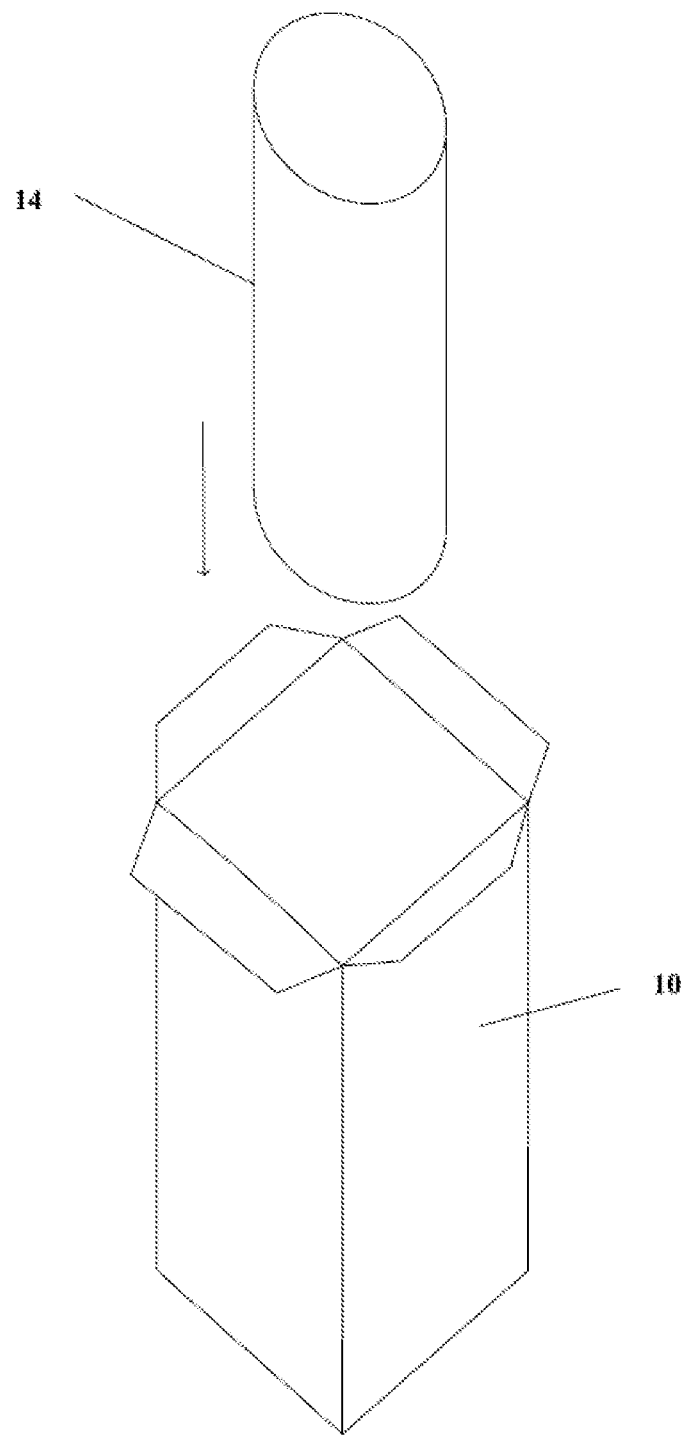
FIG. 9 shows the package according to Embodiment 7 of the present disclosure before goods are put into the box.
Figure 10:
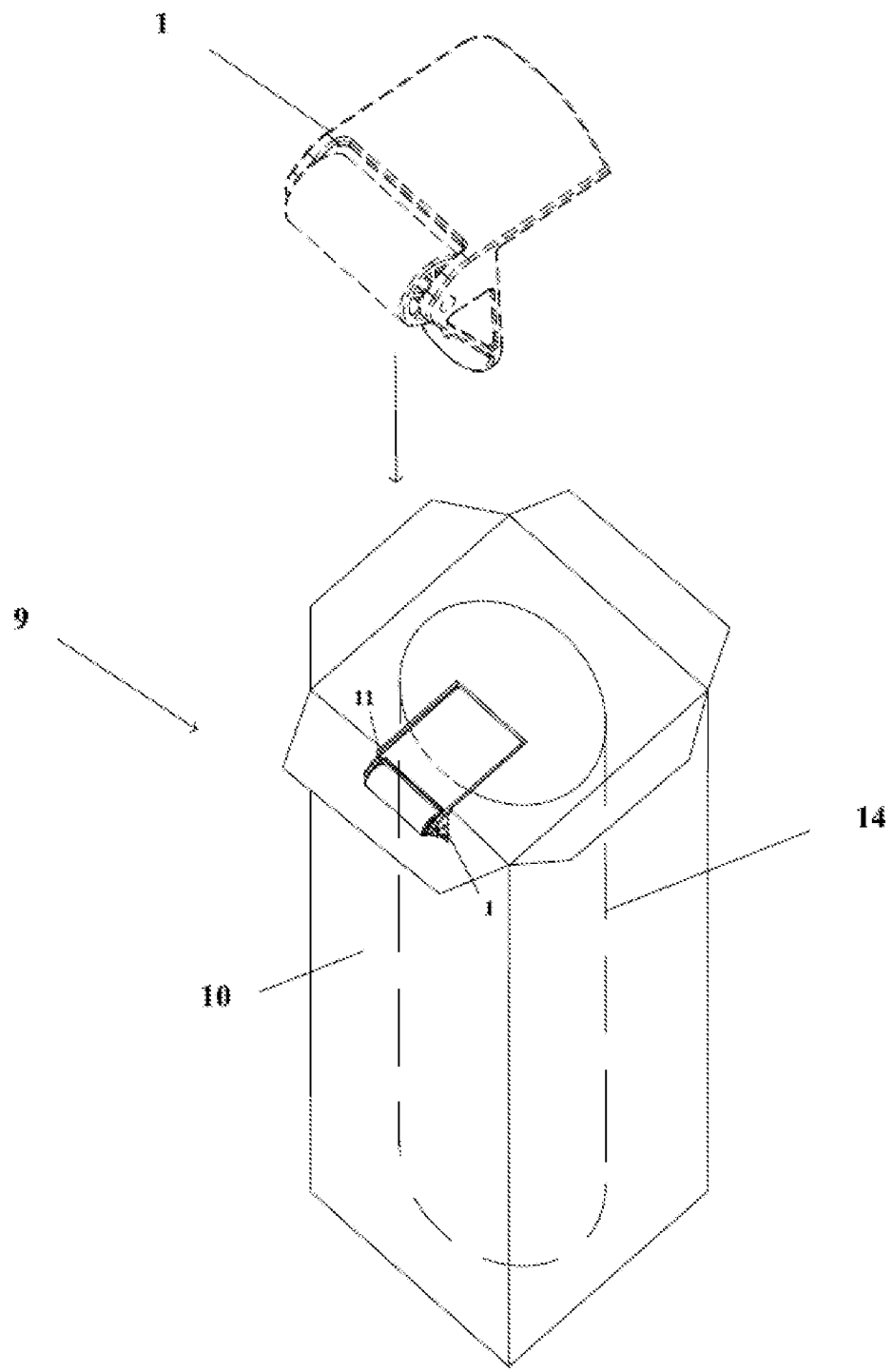
FIG. 10 shows the package according to Embodiment 7 of the present disclosure, where the roller assembly is put into the box after the goods.
Figure 11:
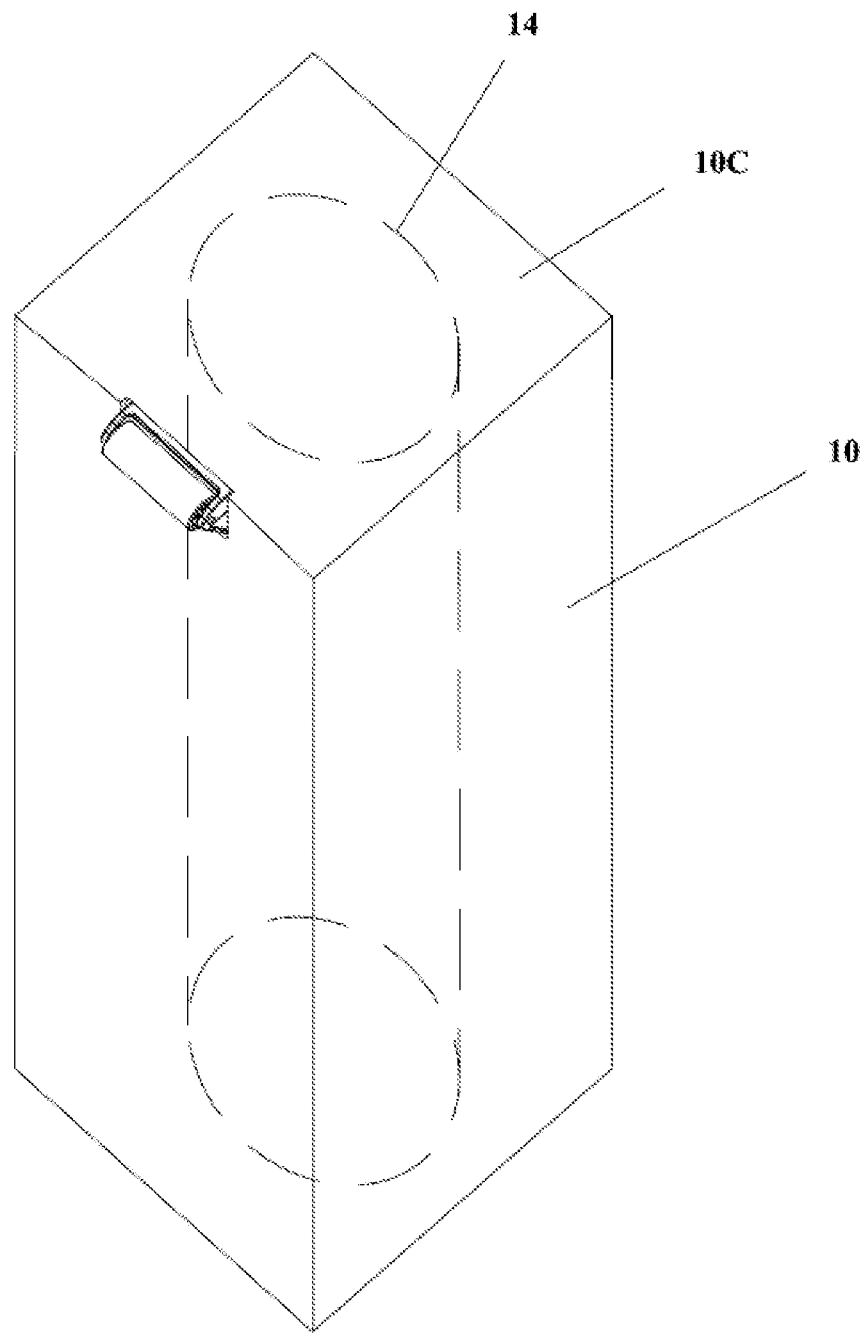
FIG. 11 shows the package according to Embodiment 7 of the present disclosure after the package is packed.

As shown in FIG. 9-FIG. 11, the method of using the package 9 is achieved as follows, and the package 9 in the present embodiment is any one package described in Embodiments 3-6. The box 10 is opened and the matter 14 to be packaged is put into the box 10. Then the roller assembly 1 is placed into the box 10, and the roller assembly 1 is sandwiched between the box 10 and the matter 14 to be packaged. Next, the roller(s) 2 is aligned with the hole(s) 11. Subsequently, the box 10 and the matter 14 to be packaged are compressed to make the roller(s) 2 protrude from the hole(s) 11. Finally, the box 10 are sealed from the bottom surface 10C to complete the package.

The foregoing descriptions are merely preferred embodiments of the present disclosure, and are not used to limit the scope of the present disclosure. Any modifications, equivalent replacements and improvements made within the spirit and principle of the present disclosure should be included in the protection scope of the present disclosure.

What is claimed is:

1. A package, comprising:
a box comprising a first corner edge and at least one hole formed at or adjacent to the first corner edge of the box; and
a roller assembly removably disposed inside of the box, wherein the roller assembly comprises:
an L-shaped board comprising a first portion, a second portion, and a first edge formed by the first and second portions;
at least one L-shaped fixing member, each of the at least one L-shaped fixing member comprising a third portion, a fourth portion, a second edge formed by the third and fourth portions, a roller bracket and a connecting rod, wherein
the third portion is fixedly connected to the first portion of the L-shaped board;
the fourth portion is fixedly connected to the second portion of the L-shaped board;
the second edge formed by the third and fourth portions is substantially parallel to the first edge formed by the first and second portion of the L-shaped board;
the roller bracket is formed at a side of the third portion opposite to the first portion of the L-shaped board; and
the connecting rod is fixedly connected to or integrally formed with the roller bracket; and
at least one roller, each respective roller in the at least one roller rotatably connected to the connecting rod of a corresponding fixing member in the at least one fixing member,
wherein the roller assembly is configured to be removably disposed inside of a box with the at least one roller protruded out of the box to allow transportation of the box by rolling;
wherein
the first and second portions of the L-shaped board of the roller assembly are disposed between the box and a matter packaged in the box;
the first edge formed by the first and second portion of the L-shaped board of the roller assembly is substantially parallel to the first corner edge of the box; and
the at least one roller of the roller assembly protrudes from the box through the at least one hole formed at or adjacent to the first corner edge of the box.

2. The package of claim 1, wherein the box comprises a top surface, a plurality of sidewalls, and a bottom surface; the bottom surface is openable, the bottom surface meets the plurality of sidewalls to form a plurality of corner edges; the plurality of corner edges comprises the first corner edge.

3. The package of claim 2, wherein a handle chamber is arranged on the top surface, and a foldable handle is installed in the handle chamber.

4. The package of claim 3, wherein the handle chamber comprises a U-shaped groove, and the U-shaped groove is symmetrical with respect to a center line of the top surface.

5. The package of claim 3, wherein the handle chamber comprises a bar groove, and an end of the bar groove is arranged on a center line of the top surface.

6. A method of making a rollable package, comprising:
obtaining the package of claim 1;
opening the box of the package and putting a matter to be packaged into the box;
placing the roller assembly of the package into the box, so that the first and second portions of the L-shaped board of the roller assembly are to be sandwiched between the box and the matter to be packaged upon completion of the rollable package;
aligning the at least one roller of the roller assembly with the at least one hole formed at or adjacent to the first corner edge of the box;
compressing one or more of the box and the matter to be packaged to make the at least one roller of the roller assembly protrude from the at least one hole formed at or adjacent to the first corner edge of the box;
sealing the box to complete the rollable package.

7. The package of claim 1, wherein a number of the at least one roller is equal to a number of the at least one L-shaped fixing member.

8. The package of claim 1, wherein for each respective roller in the at least one roller, the connecting rod passes through a center of the respective roller, two ends of the connecting rod are fixed and connected to the roller bracket, and the respective roller rotates around the connecting rod.

9. The package of claim 1, wherein the at least one L-shaped fixing member is fixed on the L-shaped board by screws, or the at least one L-shaped fixing member is welded on the L-shaped board through solders.

10. The package of claim 1, wherein the L-shaped board is made of a material selected from the group consisting of plastic, metal and rubber.

11. A package, comprising:
a box comprising:
a top surface;
a plurality of sidewalls;
a bottom surface that is openable;
a plurality of corner edges formed by the bottom surface and the plurality of sidewalls, wherein the plurality of corner edges comprises a first corner edge formed by the bottom surface and a first sidewall in the plurality of sidewalls; and
at least one hole formed at or adjacent to the first corner edge; and
a roller assembly removably disposed inside of the box, wherein the roller assembly comprises:
an L-shaped board configured to be removably disposed inside of the box, the L-shaped board comprising a first portion, a second portion integrally formed with the first portion, and a first edge formed by the first and second portions;
at least one fixing member fixedly connected to the L-shaped board, wherein when the L-shaped board is disposed inside of the box, the at least one fixing member is disposed at or adjacent to the at least one hole of the box; and
at least one roller, each respective roller in the at least one roller rotatably connected to a corresponding fixing member in the at least one fixing member, wherein when the L-shaped board is disposed inside of the box, each respective roller in the at least one roller is protruded outward from the box through a corresponding hole in the at least one holes of the box and rotatable around an axis substantially parallel to the first corner edge in the plurality of corner edges of the box, thereby allowing transportation of the box with the matter packaged in the box by rolling;
wherein when the L-shaped board is disposed inside of the box:
the first portion of the L-shaped board of the roller assembly is disposed between the first side wall in the plurality of sidewalls of the box and a matter packaged in the box;
the second portion of the L-shaped board of the roller assembly is disposed between the bottom surface of the box and the matter packaged in the box;
the first edge formed by the first and second portion of the L-shaped board of the roller assembly is substantially parallel to the first corner edge in the plurality of corner edges of the box; and
the at least one roller of the roller assembly protrudes from the box through the at least one hole formed at or adjacent to the first corner edge in the plurality of corner edges of the box.

12. The package of claim 11, further comprises a handle connected to the top surface of the box and foldable with respect to the top surface of the box.

13. The package of claim 12, wherein the top surface of the box comprises a handle chamber to accommodate the handle when the handle is folded.

14. A method of making a rollable package, comprising:
obtaining the package of claim 11;
putting a matter to be packaged into the box of the package;
placing the roller assembly of the package into the box so that upon completion of the rollable package, the first and second portions of the L-shaped board of the roller assembly are sandwiched between the box and the matter to be packaged, and the at least one roller of the roller assembly is protruded outward from the box through the at least one hole formed at or adjacent to the first corner edge of the box; and
closing the box to complete the rollable package.

15. The method of claim 14, further comprising:
prior to the closing of the box:
aligning the at least one roller of the roller assembly with the at least one hole formed at or adjacent to the first corner edge of the box; and
compressing one or more of the box and the matter to be packaged to make the at least one roller of the roller assembly protrude from the at least one hole formed at or adjacent to the first corner edge of the box.

16. The package of claim 11, wherein:
the at least one L-shaped fixing member comprises a first fixing member and a second fixing member spaced apart along a direction substantially parallel to the first edge formed by the first and second portions; and
the at least one roller comprising a first roller rotatably connected to the first fixing member and a second roller rotatably connected to the second fixing member.

17. The package of claim 11, wherein each respective fixing member in the at least one fixing member comprises:
a third portion fixedly connected to the first portion of the L-shaped board;
a fourth portion fixedly connected to the second portion of the L-shaped board;
a second edge formed by the third and fourth portions and substantially parallel to the first edge formed by the first and second portion of the L-shaped board; and
a roller bracket formed at a side of the third portion opposite to the first portion of the L-shaped board,
wherein each respective roller in the at least one roller is rotatably connected to the corresponding fixing member in the at least one fixing member through a connecting rod that is fixedly connected to or integrally formed with the roller bracket of the corresponding fixing member.

18. The package of claim 17, wherein the third portion, fourth portion and roller bracket are integrally formed with each other.

* * * * *